United States Patent
Hari et al.

(10) Patent No.: US 9,991,800 B2
(45) Date of Patent: Jun. 5, 2018

(54) SWITCHED MODE POWER SUPPLY WITH EFFICIENT OPERATION AT LIGHT LOADS AND METHOD THEREFOR

(71) Applicant: SEMICONDUCTOR COMPONENTS INDUSTRIES, LLC, Phoenix, AZ (US)

(72) Inventors: Ajay Karthik Hari, Scottsdale, AZ (US); Bryan McCoy, Chandler, AZ (US)

(73) Assignee: SEMICONDUCTOR COMPONENTS INDUSTRIES, LLC, Phoenix, AZ (US)

(*) Notice: Subject to any disclaimer, the term of this patent is extended or adjusted under 35 U.S.C. 154(b) by 19 days.

(21) Appl. No.: 15/137,683

(22) Filed: Apr. 25, 2016

(65) Prior Publication Data

US 2016/0344293 A1 Nov. 24, 2016

Related U.S. Application Data

(60) Provisional application No. 62/164,462, filed on May 20, 2015, provisional application No. 62/219,527, filed on Sep. 16, 2015.

(51) Int. Cl.
*G05F 1/565* (2006.01)
*G05F 1/569* (2006.01)
(Continued)

(52) U.S. Cl.
CPC ......... *H02M 3/33507* (2013.01); *H02M 1/44* (2013.01); *H02M 3/33569* (2013.01);
(Continued)

(58) Field of Classification Search
CPC .............. H02M 1/34; H02M 3/33523; H02M 3/33576; H02M 3/33592
(Continued)

(56) References Cited

U.S. PATENT DOCUMENTS 5,805,432 A * 9/1998 Zaitsu ..................... H02M 1/34
                                                        363/16
6,760,235 B2   7/2004 Lin et al.
(Continued)

OTHER PUBLICATIONS

Semiconductor Components Industries, LLC, Datasheet NCP1377, "PWM Current-Mode Controller for Free-Running Quasi-Resonant Operation," Rev. 11, Jan. 2011, pp. 1-17.
(Continued)

*Primary Examiner* — Adolf Berhane
*Assistant Examiner* — Gary Nash
(74) *Attorney, Agent, or Firm* — Polansky & Associates, P.L.L.C.; Paul J. Polansky

(57) ABSTRACT

A switched mode power supply includes an active clamp flyback converter having an input for receiving an input voltage, and an output for providing a regulated voltage, the active clamp flyback converter having a first switch for controlling a flow of current through a primary winding of a flyback transformer, and a second switch for clamping a switch node on a primary side of the flyback transformer, and a controller for controlling the first and second switches to operate the active clamp flyback converter in an active clamp flyback mode when a load current is above a first predetermined level, and for controlling the first and second switches to operate the active clamp flyback converter in a discontinuous conduction mode with a variable switching frequency when the load current is below a second predetermined level.

30 Claims, 7 Drawing Sheets

(51) Int. Cl.
*G05F 1/571* (2006.01)
*G05F 1/00* (2006.01)
*H02H 7/00* (2006.01)
*H02H 9/00* (2006.01)
*H02M 3/335* (2006.01)
*H02M 1/44* (2007.01)
*H02M 1/00* (2006.01)

(52) U.S. Cl.
CPC ............... *H02M 2001/0003* (2013.01); *H02M 2001/0058* (2013.01); *Y02B 70/1491* (2013.01)

(58) Field of Classification Search
USPC ................ 323/274–277, 284, 285; 361/18
See application file for complete search history.

(56) References Cited

U.S. PATENT DOCUMENTS

| | | | | |
|---|---|---|---|---|
| 8,009,448 | B2* | 8/2011 | Liu | H02M 3/33569 363/21.01 |
| 2005/0201128 | A1* | 9/2005 | Jin | H02M 1/08 363/56.01 |
| 2008/0315858 | A1* | 12/2008 | Hong | H02M 3/33569 323/351 |
| 2011/0194311 | A1* | 8/2011 | Gaknoki | H02M 7/217 363/21.12 |
| 2012/0320640 | A1* | 12/2012 | Baurle | H02M 3/33507 363/21.17 |
| 2014/0307484 | A1* | 10/2014 | Yang | H02M 3/33569 363/21.12 |
| 2015/0381031 | A1* | 12/2015 | Ghosh | H02M 1/34 363/21.12 |

OTHER PUBLICATIONS

Jee-Hoon Jung et al., "Low Standby Power Consumption and High Cross Regulation of Active Clamp Flyback Converter with SSPR", IECON 2010, 36th Annual Conference on IEEE Industrial Electronics Society, 2010, pp. 544-549.

Bor-Ren Lin et al., "Analysis, Design and Implementation of an Active Clamp Flyback Converter," 2005 International Conference on Power Electronics and Drives Systems, 2005, pp. 424-429.

Koji Yoshida et al., "Zero Voltage Switching Apparatus for Flyback Converter," 14th International Telecommunications Energy Conference, INTELEC '92, 1992, pp. 324-329.

* cited by examiner

SWITCHED MODE POWER SUPPLY WITH EFFICIENT OPERATION AT LIGHT LOADS AND METHOD THEREFOR

FIELD

This disclosure relates generally to power converters, and more specifically to switched mode power supplies that operate under widely varying load conditions.

BACKGROUND

Switched mode power supplies can be used to create a direct current (DC) voltage from an alternating current (AC) voltage by switching current through an energy storage element such as a transformer. The duty cycle of the switching is controlled to regulate the output voltage to a desired level. Switched mode power supplies are generally efficient at heavier loads but less efficient at lighter loads. Two popular types of isolated switched mode power supplies are forward mode and flyback mode converters.

Flyback converters are common in AC voltage to DC voltage applications. A flyback converter is based on a flyback transformer that alternately builds up flux in the magnetic core and transfers energy to the output. When current is switched through the primary winding, the primary current in the transformer increases, storing energy within the transformer. When the switch is opened, the primary current in the transformer drops, inducing a voltage on the secondary winding. The secondary winding supplies current into the load. A controller varies the on- and off-times of a primary switch in series with the primary winding to regulate the output voltage to a desired level.

Flyback converters can be configured to switch additional reactive elements in parallel to the primary winding using a topology known as active clamp flyback (ACF). ACF converters can reduce electric stress on components and improve efficiency by achieving close to zero volt switching (ZVS) of the primary switch and to produce clean drain waveforms without any ringing. They also allow soft increase in secondary current. However while ACF converters have high efficiency at medium and heavy loads, their efficiency decreases at lighter loads due to continuous conduction losses from magnetizing current that continuously circulate on the primary side of the transformer due to the additional reactive elements. Moreover, ACF converters are not suitable for other techniques that improve efficiency at light loads such as cycle skipping and frequency foldback.

Figure 1:
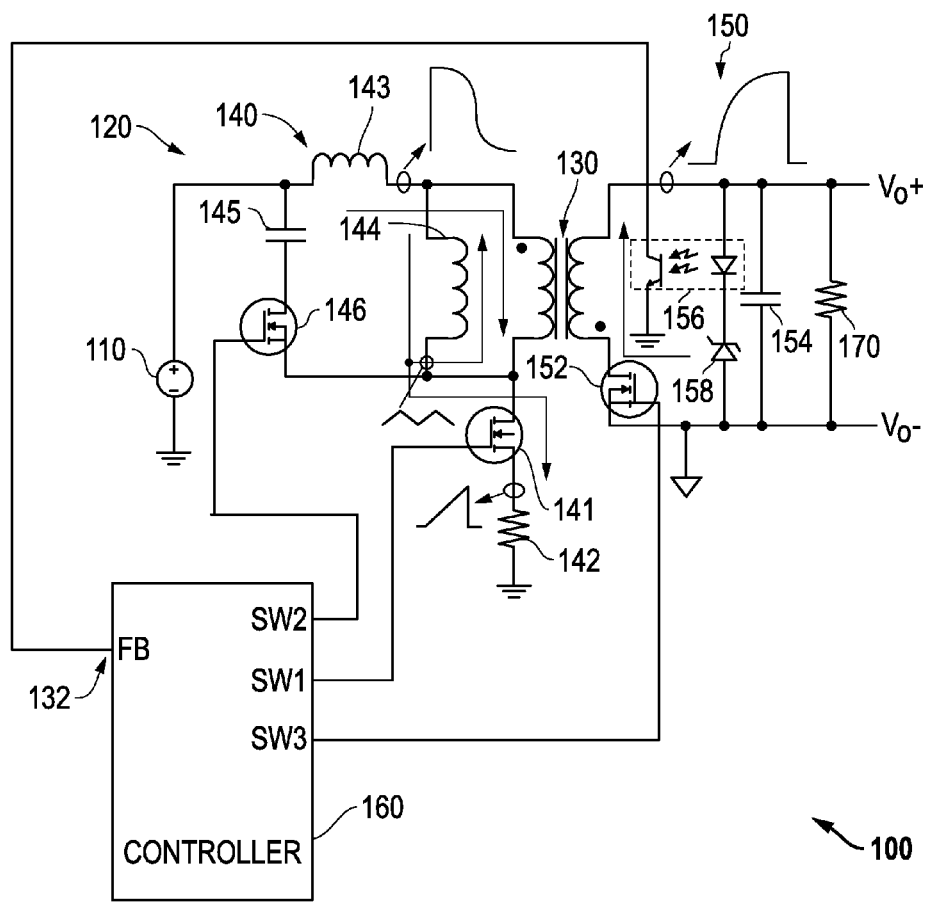
FIG. 1 illustrates in partial schematic and partial block diagram form a switched mode power supply according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF ILLUSTRATIVE EMBODIMENTS

In one form, a switched mode power supply includes an active clamp flyback converter and a controller. The active clamp flyback converter has an input for receiving an input voltage, and an output for providing a regulated voltage, the active clamp flyback converter having a first switch for controlling a flow of current through a primary winding of a flyback transformer, and a second switch for clamping a switch node on a primary side of the flyback transformer. The controller is for controlling the first and second switches to operate the converter in an active clamp flyback mode when a load current reaches a first predetermined level, and for controlling the first and second switches to operate the active clamp flyback converter in a discontinuous conduction mode with a variable switching frequency when the load current reaches a second predetermined level.

In some embodiments, a switched mode power supply includes a controller for controlling a first switch and a second switch of an active clamp flyback converter. The controller configures the first switch to control a flow of current through a primary winding of a flyback transformer. The controller configures the second switch to control an active clamp on a primary side of the flyback transformer. The controller is configured to control the first and second switches to operate the converter in an active clamp flyback mode when a load current is greater than a first predetermined level, and further configured to control the first and second switches to operate the active clamp flyback converter in a discontinuous conduction mode with a variable switching frequency when the load current is less than a second predetermined level.

FIG. 1 illustrates in schematic form a switched mode power supply (SMPS) 100 according to some embodiments. SMPS 100 includes an active clamp flyback (ACF) converter 120 and a controller 160 for receiving an input voltage from a voltage source 110 and converting the input voltage to an output voltage $V_o$ that drives a load 170.

When used as an AC-to-DC converter, voltage source 110 represents the output of a full wave rectified (haversine) and capacitively smoothed AC line voltage. When used in DC-DC converters, voltage source 110 represents a DC voltage source.

ACF converter 120 includes generally a flyback transformer 130, a primary side circuit 140, and a secondary side circuit 150. Flyback transformer 130 has primary and secondary windings each with first and second ends, and a magnetic core that inductively couples the primary and secondary windings.

Primary side circuit 140 includes a switch 141, a resistor 142, inductors 143 and 144, a capacitor 145, and a switch 146. Switch 141 is implemented as an N-channel metal-oxide-semiconductor (MOS) transistor having a drain connected to the second end of the primary winding of flyback transformer 130, a gate, and a source. Resistor 142 has a first terminal connected to the source of switch 141, and a second terminal connected to ground. Inductor 143 has a first terminal connected to the output terminal of voltage source 110, and a second terminal connected to the first end of the primary winding of flyback transformer 130. Inductor 144 has a first terminal connected to the first end of the primary winding of flyback transformer 130, and a second terminal connected to the second end of the primary winding of flyback transformer 130. Capacitor 145 has a first terminal connected to the output terminal of voltage source 110, and a second terminal. Switch 146 is implemented as an N-channel MOS transistor having a first source/drain terminal connected to the second terminal of capacitor 145, a gate, and a second source/drain terminal connected to the second end of the primary winding of flyback transformer 130. Switch 146 in particular can also be a P-channel MOS transistor and if so it is typically referenced to ground.

Secondary side circuit 150 includes an output switch 152, a load capacitor 154, an optocoupler 156, and a Zener diode 158. Output switch 152 is implemented as an N-channel MOS transistor having a drain connected to the second end of the secondary winding of flyback transformer 130, a gate, and a source connected to ground. Output switch 152 in certain embodiments can also be a rectifier. Load capacitor 154 has a first terminal connected to the first end of the secondary winding of flyback transformer 130, and a second terminal connected to ground. Optocoupler 156 includes a photo-diode having an anode connected to the first end of the secondary winding of flyback transformer 130, and a cathode, and a phototransistor optically coupled to the photodiode and having a collector and an emitter. Zener diode 158 has a cathode connected to the cathode of the photodiode of optocoupler 156, and an anode connected to ground.

Controller 160 has an input connected to the collector of the phototransistor of optocoupler 156, an output connected to the gate of switch 141 for providing a first switching signal labeled "SW1" thereto, an output connected to the gate of switch 146 for providing a second switching signal labeled "SW2" thereto, and an output connected to the gate of switch 152 for providing a third switching signal labeled "SW3" thereto. As shown in FIG. 1 controller 160 is implemented by a single integrated circuit whereas the other elements of switched mode power supply 100 are implemented as discrete components. In other embodiments, different combinations of components can be implemented together on a single integrated circuit. For example, switches 141 and 146 can be combined with the other circuitry of controller 160 in a single integrated circuit.

Load 170 is represented in FIG. 1 as a resistor having a first terminal connected to the first end of the secondary winding of flyback transformer 130, and a second terminal connected to ground. Note that ground on the secondary side is shown with a different symbol than on the primary side because the two grounds may be floating with respect to each other.

In addition to N-channel MOS transistors, switches 141, 146, and 152 may be implemented with any of a variety of semiconductor based switches, including bipolar transistors, insulated gate bipolar transistors, junction field effect transistors (JFETs), gallium nitride high electron mobility transistors (GaN HEMTs), thyristors, gate turn-off thyristors, triacs, PiN diodes, Schottky diodes, power MOSFETs, and the like.

In operation, controller 160 controls the activation of switches 141, 146, and 152 using signals SW1, SW2, and SW3 to operate ACF converter 120 to regulate output voltage $V_o$ to a desired level. Optocoupler 156 provides feedback signal FB to controller 160, and controller 160 compares the level of the FB signal to a reference voltage and varies the duty cycles of switches 141, 146, and 152 in response to the comparison to regulate $V_o$ to a desired level.

The operation of ACF converter 120 proceeds as follows. Primary side circuit 140 includes not only switch 141 and resistor 142, but also additional reactive elements in parallel with the primary winding of flyback transformer 130 including inductor 144 and capacitor 145. Capacitor 145 is connected in series with switch 146 to form an active clamp. Controller 160 turns switch 146 on during portions of the off times of switch 141, and varies the duty cycle of switch 146 within the off times as will be described below. In this way ACF converter 120 uses the energy stored in parasitics to achieve a zero voltage switch (ZVS) instead of dissipating the energy in a snubber circuit. ACF converter 120 also reduces spikes that occur due to switching transients, resulting in lower electromagnetic interference (EMI).

Controller 160, however, differs from known ACF converters by operating in an ACF mode for heavy loads, but in a discontinuous conduction mode with variable frequency for light loads. In discontinuous conduction mode, switch 146 remains nonconductive, effectively converting ACF converter 120 into a DCM converter and avoiding the magnetizing current losses through capacitor 145. By operating in DCM at light loads, ACF converter 120 allows the strict requirements for standby and system efficiency imposed by various worldwide regulatory authorities to be met.

In the embodiment shown in FIG. 1, controller 160 determines when to switch from ACF mode to discontinuous conduction mode with variable frequency using the FB signal itself. Controller 160 is able to use the FB signal to detect the light load condition because during light load, the normal voltage regulation loop is unable to regulate $V_o$ to the desired level. For example after a sudden switch to a light load condition, such as load 170 entering a low-power standby mode, $V_o$ rises above the desired level. As $V_o$ rises, the photodiode of optocoupler 156 emits more photons, causing the phototransistor of optocoupler 156 to become more conductive and to decrease the level of the FB signal. In other embodiments, the load current can be measured directly by placing a low-valued resistor between the first end of the secondary winding of flyback transformer 130 and load 170 and measuring the load current using the voltage difference across the resistor. Further in another embodiment the primary current, typically measured at current sense resistor 142, can be used to mathematically compute load current. However using the FB signal to determine the level of the load avoids the need for additional integrated circuit pins since controller 160 already uses the FB signal pin in the voltage regulation loop.

Moreover as will be described in more detail below, controller 160 further implements soft transitions between ACF mode and DCM mode to ensure ZVS, reduce stress on the secondary side of flyback transformer 130, and allow time for the loop to stabilize. It implements the soft transitions using leading edge modulation for the phase in and phase out of switch 146. Thus for example a large amount of energy which may be held in capacitor 145 while ACF converter 120 is in DCM mode is transferred to the secondary of transformer 130 in a controlled fashion. If the transition were to occur in a single cycle, all of the energy held in capacitor 145 would be transferred to the secondary in a single cycle, potentially causing damage to the system from large transients.

Controller 160 switches from ACF mode to discontinuous conduction mode with variable frequency when the FB signal drops below a specified threshold. This operation will now be described.

Figure 2:
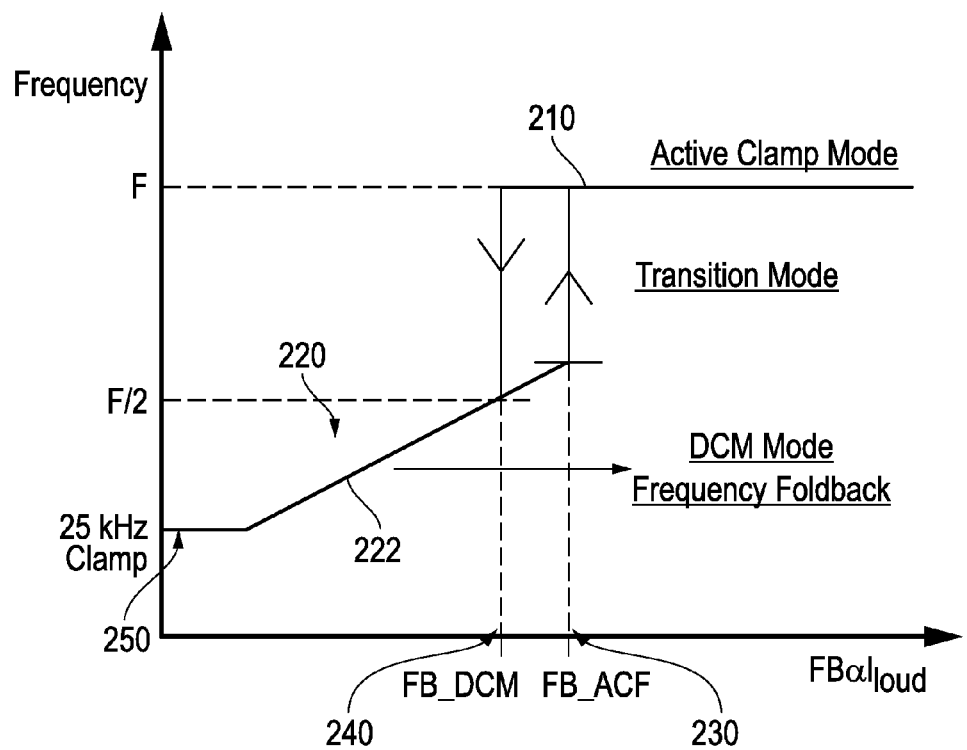
FIG. 2 illustrates in graphical form the switching behavior of the switched mode power supply of FIG. 1.

FIG. 2 illustrates in graphical form the switching behavior of switched mode power supply 100 of FIG. 1. In FIG. 2, the horizontal axis represents the FB signal in volts, and the vertical axis represents switching frequency in kilohertz (kHz). For values of the FB signal above a level labeled "FB_ACF", ACF converter 120 operates in ACF mode at a constant frequency. For values of the FB signal below a level labeled "FB_DCM", ACF converter 120 operates in DCM mode with variable frequency, i.e. it performs frequency foldback, in which the switching frequency reduces proportionately as the FB signal decreases, until the switching frequency reaches a value of 25 kHz, at which point ACF controller 120 clamps the switching frequency at 25 kHz to prevent further decreases in the switching frequency. The value of 25 kHz is chosen to be above the human audible frequency range so the switching of controller 160 does not cause audible noise.

ACF converter 120 also implements hysteresis in a transition mode when changing between ACF mode and DCM mode for values of the FB signals between FB_DCM and FB_ACF. Assume that ACF converter 120 is in ACF mode but the load lightens. As the FB signal decreases below the FB_ACF level, ACF converter 120 remains in ACF mode until the FB signal reaches FB_DCM. When the FB signal falls further below FB_DCM, ACF converter 120 initially reduces the switching frequency from pre-determined frequency F to a fraction of that pre-determined frequency. As the FB signal decreases further below the FB_DCM level, ACF converter 120 reduces the switching frequency linearly until it reaches 25 kHz, at which point it clamps the switching frequency at 25 kHz despite further reductions in the load. In another embodiment, ACF converter 120 could implement a time-based hysteresis where transition from one mode to another mode is prohibited for a pre-determined time.

Now assume that ACF converter 120 is in DCM mode but the load increases. As the FB signal increases, ACF converter 120 remains in DCM mode and increases the switching frequency linearly. The switching frequency reaches a pre-determined threshold at the FB_DCM level but continues to increase linearly as the FB signal increases further. However when the FB signal reaches the FB_ACF level, ACF converter 120 increases the switching frequency to F, changes to ACF mode, and keeps the switching frequency constant at F for further increases in the FB signal.

In some embodiments, controller 160 may be pre-programmed to set a slope 222 of the frequency foldback and to set a clamp frequency. Moreover controller 160 may also be programmed to set the FB_DCM and FB_ACF levels and hence the width of the transition region. These programming options may be achieved by, for example, setting the values of external components or programming controller 160 through a serial port.

Controller 160 implements gradual phasing in of switch 146 during transitions from DCM to ACF mode, and gradual phasing out of switch 146 during transitions from ACF mode to DCM mode. Gradual phase in produces guaranteed ZVS and reduces secondary side stress, allowing time for the loop to stabilize. As will be described further below, controller 160 uses leading edge modulation for phasing in transistor 146 as controller 160 transitions the ACF converter 120 from discontinuous conduction mode 220 to active clamp flyback mode 210, and phasing out transistor 146 as controller 160 transitions the ACF converter 120 from active clamp flyback mode 210 to discontinuous conduction mode 220. In an alternate embodiment, controller 160 can use trailing edge modulation for phasing in or phasing out switch 146.

Figure 3:
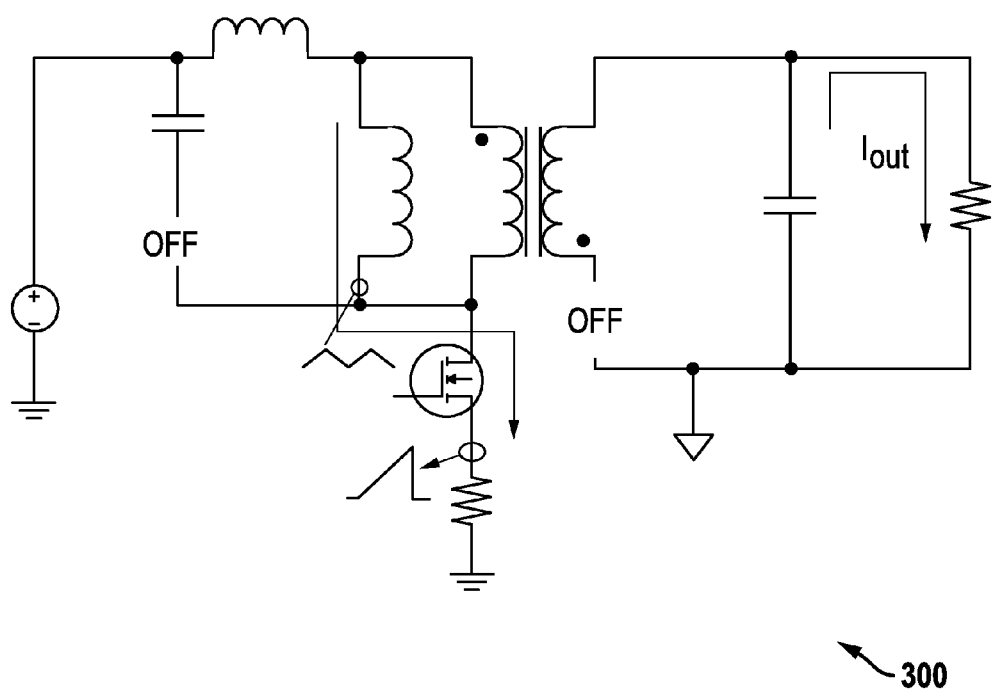
FIG. 3 illustrates in schematic form the switched mode power supply of FIG. 1 in an energy storage phase.
Figure 4:
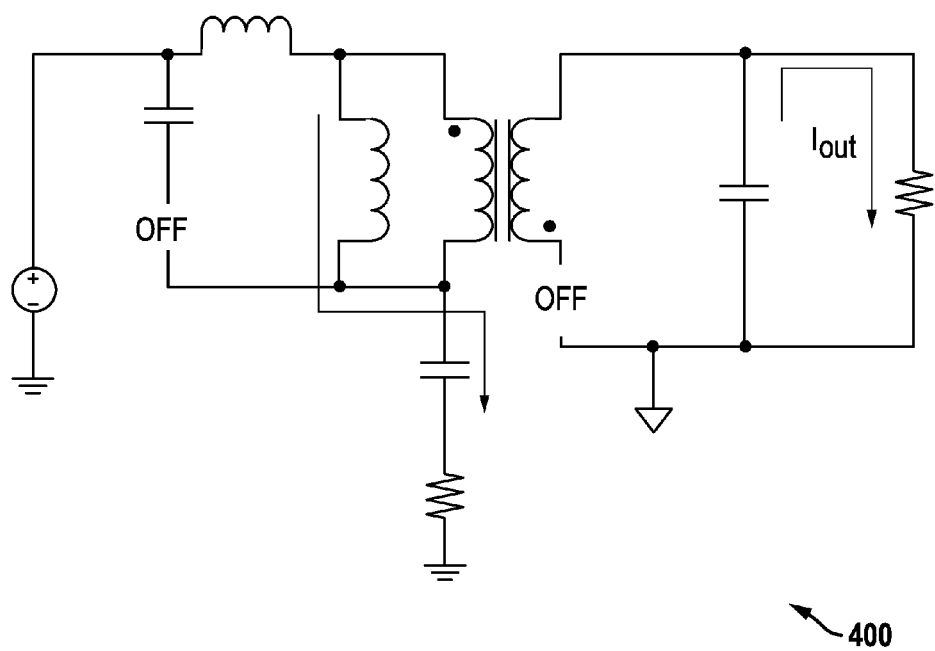
FIG. 4 illustrates in schematic form the switched mode power supply of FIG. 1 in a transition out of energy storage phase.
Figure 5:
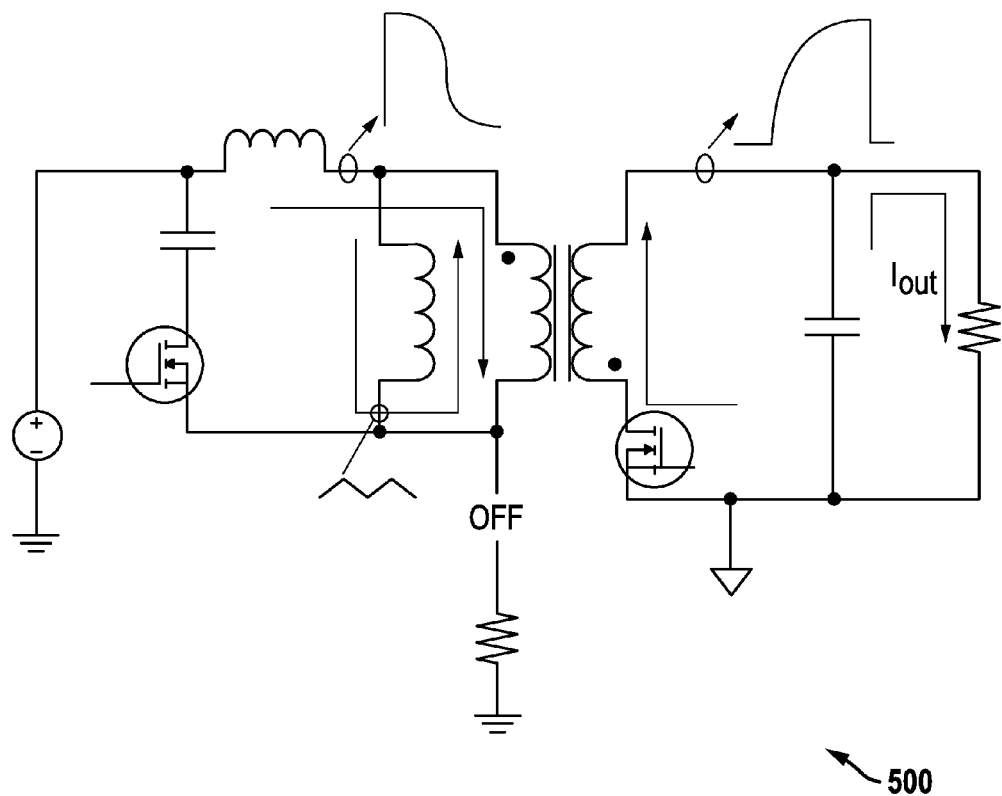
FIG. 5 illustrates in schematic form the switched mode power supply of FIG. 1 in a resonant power delivery phase.

FIGS. 3-5 illustrate in schematic form switched mode power supply 100 of FIG. 1 in respective switching phases. FIG. 3 illustrates in schematic form switched mode power supply 100 of FIG. 1 in an energy storage phase 300. In energy storage phase 300, switch 141 is conductive, causing current to flow through the primary winding of flyback transformer 130 and to build up flux in flyback transformer 130. In this phase, switch 146 is off regardless of whether ACF converter 120 is in ACF or DCM mode. Current through switch 141 gradually builds. Switch 152 is off.

FIG. 4 illustrates in schematic form switched mode power supply 100 of FIG. 1 in a transition phase 400 out of energy storage phase 300. In transition phase 400, switches 141, 146, and 152 are all nonconductive. The capacitance of switch 141 creates a reactive path that interacts with inductor 144 and causes current to flow.

FIG. 5 illustrates in schematic form the switched mode power supply of FIG. 1 in a resonant power delivery phase 500. In resonant power delivery phase 500, switch 141 is nonconductive, whereas switches 146 and 152 are conductive. In this phase, capacitor 145 creates a resonant power delivery path to prevent the switch off of switch 141 from causing harmful transients. Switch 152 becomes conductive, closing the secondary circuit to cause flyback transformer 130 to drive current into load 170.

Figure 6:
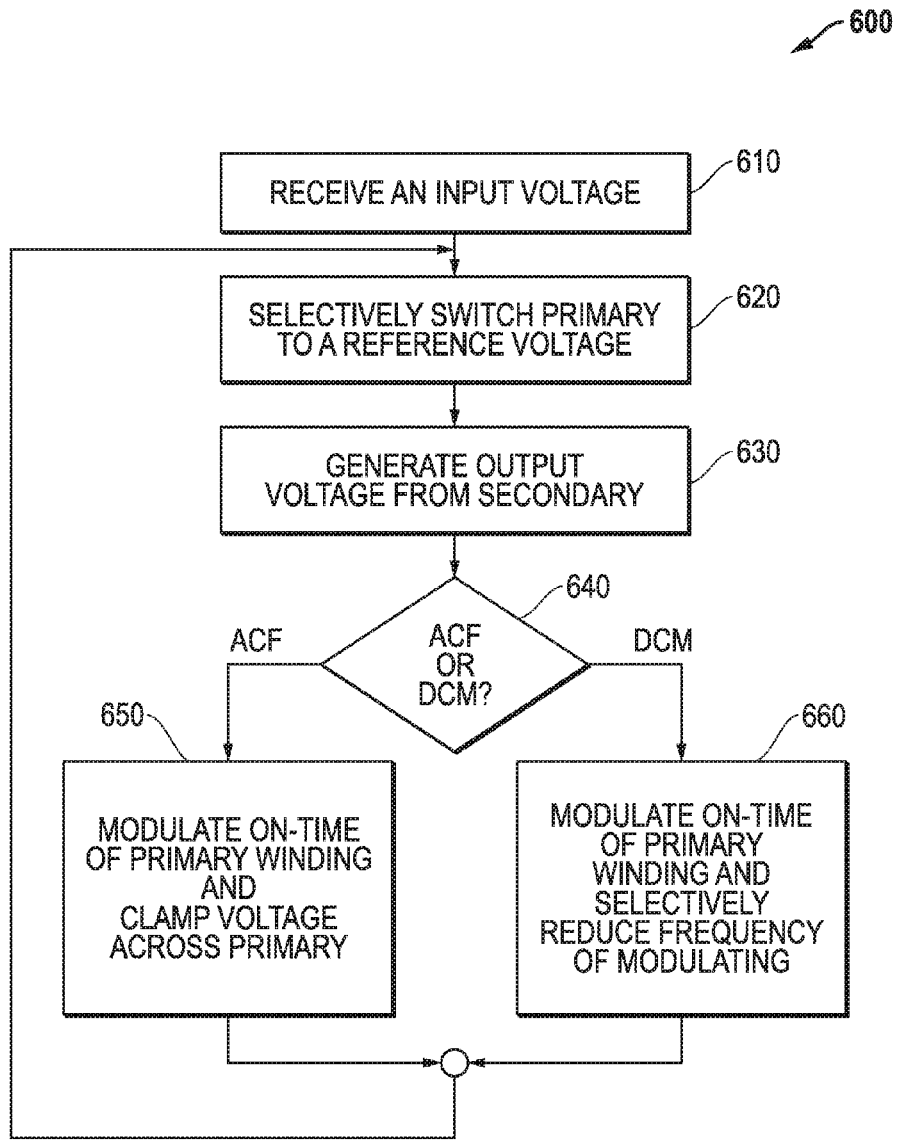
FIG. 6 illustrates a flow diagram of a method of operating a switched mode power supply according to some embodiments.

FIG. 6 illustrates a flow diagram of a method of operating a switched mode power supply according to some embodiments. At action block 610 includes receiving an input voltage at a first end of a primary winding of a transformer 130. Action box 620 includes selectively switching a second end of the primary winding to a reference voltage terminal. Action box 630 includes generating an output voltage 114 from a secondary winding of the transformer 130. Action box 640 includes determining if the switched mode power supply 100 should be running in the active clamp flyback mode or the discontinuous conduction mode in response to the load current. Action box 650 includes modulating the primary winding and selectively clamping a voltage across the primary winding to regulate the output voltage to a predetermined level. Action box 660 includes modulating the primary winding and selectively reducing a frequency of the modulating to regulate the output voltage 114 to the predetermined level.

Figure 7:
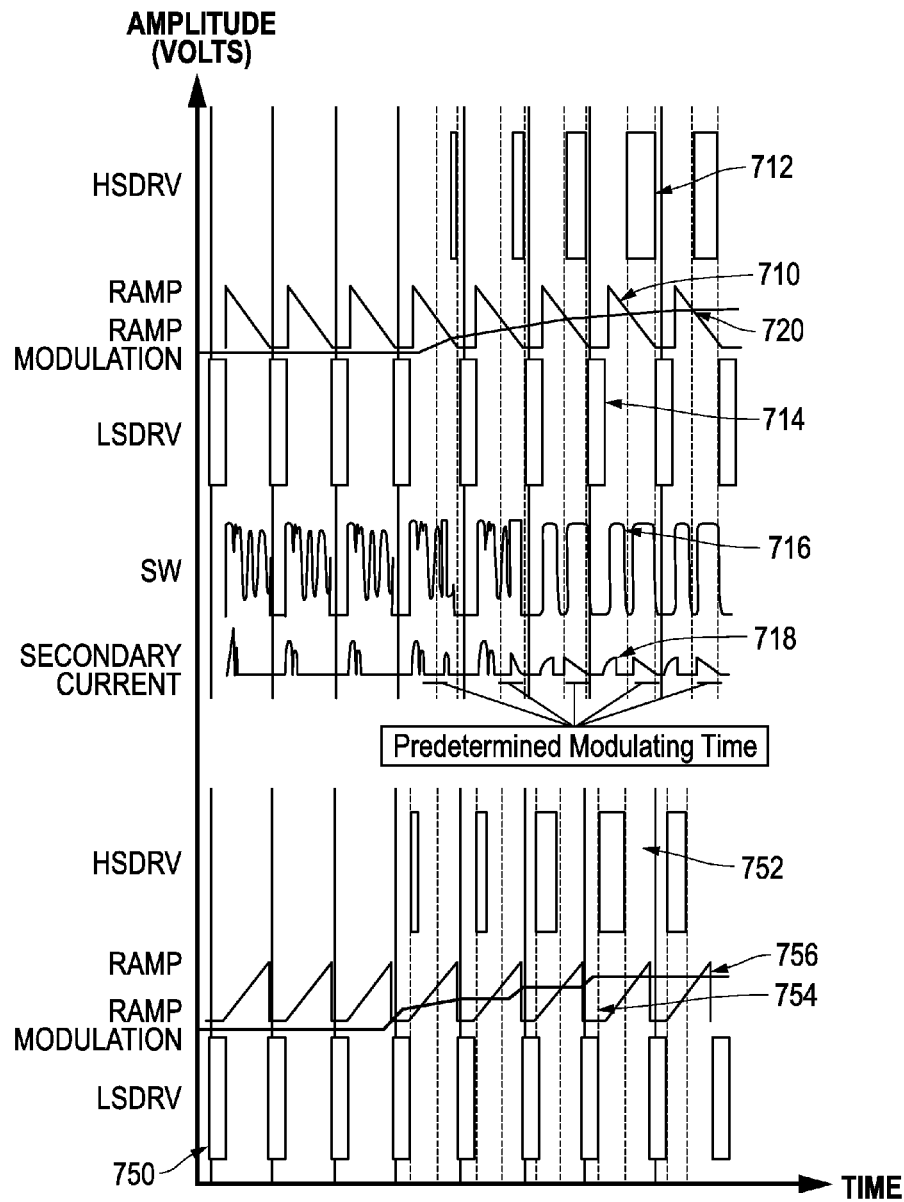
FIG. 7 illustrates in graphical form the operation of the controller of FIG. 1 during transitions between DCM mode and ACF mode according to some embodiments.

FIG. 7 illustrates in graphical form the operation of controller 160 of FIG. 1 during transitions between DCM mode and ACF mode according to some embodiments. In FIG. 7 the horizontal axis represents time in a suitable unit such as microseconds, and the vertical axis represents the voltage of various signals in volts. Several signals of interest are shown, including a set of signals related to a gradual transition between DCM and ACF modes (or "phasing in" of ACF mode) using leading edge modulation, and an alternate set of signals related to phasing in of ACF mode using trailing edge modulation.

The signals related to phasing in of ACF mode using leading edge modulation include a high side drive signal labeled "HSDRV", a RAMP signal 710, a RAMP MODULATION signal 720, a low-side drive signal labeled "LSDRV", a switch drain signal labeled "SW" 716, and a SECONDARY CURRENT signal 718. As shown by waveform 714, controller generates the LSDRV signal (corresponding to the SW1 signal of FIG. 1) using pulses that begin synchronously with respect to a clock signal, and have a duty cycle that depends on the duty cycle set by the voltage control loop. Controller 160 generates the RAMP signal as an inverted sawtooth, i.e. it rapidly increases in voltage and then gradually decreases in voltage over the remainder of the clock period. At the beginning of the DCM-ACF transition, controller 160 generates RAMP MODULATION signal 720 as a monotonically increasing signal by, e.g., slowly charging a capacitor, counting using a digital code, etc. RAMP MODULATION signal 720 intersects or "cuts" RAMP signal 710 such that the active time of the HSDRV signal (corresponding to the SW2 signal of FIG. 1) increases slowly during the phase in period. In this manner, the gradual phase in allows the energy stored in capacitor 145 to be spread over a relatively long soft-start period. The results are seen in SECONDARY CURRENT signal 718, and in particular by the avoidance of large current spikes in the secondary.

The signals related to phasing in of ACF mode using trailing edge modulation include HSDRV signal 752, RAMP signal 754, RAMP MODULATION signal 756, and LSDRV signal 758. As shown by waveform 758, controller 160 generates LSDRV signal 758 using pulses that begin synchronously with respect to the clock signal and have a duty cycle that depends on the duty cycle set by the voltage control loop. At the termination of the driving of switch 141, controller 160 generates the RAMP signal as a sawtooth, i.e. it gradually increases in voltage over the clock period before decreasing rapidly at the end of the clock period. At the beginning of the DCM-ACF transition, controller 160 generates RAMP MODULATION signal 720 as a monotonically increasing signal by, e.g., slowly charging a capacitor, counting up using a digital counter, etc. RAMP MODULATION signal 756 cuts RAMP signal 754 such that the active time of the HSDRV signal increases slowly during this transition. Like leading-edge phase in, the gradual phase in using trailing edge modulation also allows the energy stored in capacitor 145 to be spread over a long soft-start period.

Although not shown in FIG. 7, controller 160 uses a similar technique for the gradual phasing out of the HSDRV signal during ACF-to-DCM transitions, using either leading-edge or trailing-edge or dual-edge modulation in a manner similar to that shown for phasing in of the HSDRV signal during leading edge modulation. Note that in addition to either leading-edge or trailing-edge modulation of a slow ramp signal, threshold driven phasing in and phasing out of switch 146 using dual edge modulation of a slow ramp signal against a faster triangular signal can also be performed. Moreover it is possible to perform phasing in and phasing out of switch 146 by generating digital signals.

The above-disclosed subject matter is to be considered illustrative, and not restrictive, and the appended claims are intended to cover all such modifications, enhancements, and other embodiments that fall within the true scope of the claims. For example in various embodiments, gradual phasing in or phasing out of the high side transistor can be achieved by leading edge modulation or by trailing edge modulation. Moreover as the load lightens in discontinuous conduction mode after the frequency is clamped to a frequency above the human audible frequency range, further loop regulation range can be achieved by cycle skipping. Moreover various types of components can be used to implement the switches, and different combinations of components can be combined into a single integrated circuit.

Thus, to the maximum extent allowed by law, the scope of the present invention is to be determined by the broadest permissible interpretation of the following claims and their equivalents, and shall not be restricted or limited by the foregoing detailed description.

What is claimed is:

1. A switched mode power supply, comprising:
   an active clamp flyback converter having an input for receiving an input voltage, and an output for providing a regulated voltage, said active clamp flyback converter having a first switch for controlling a flow of current through a primary winding of a flyback transformer, and a second switch for clamping a switch node on a primary side of said flyback transformer; and
   a controller for controlling said first and second switches to operate said active clamp flyback converter in an active clamp flyback mode when a load current reaches a first predetermined level, and for controlling said first and second switches to operate said active clamp flyback converter in a discontinuous conduction mode with a variable switching frequency when said load current reaches a second predetermined level, wherein said controller keeps said second switch inactive while said active clamp flyback converter is in said discontinuous conduction mode.

2. The switched mode power supply of claim 1 wherein said controller uses a first threshold of a measured signal related to said load current to transition from said active clamp flyback mode to said discontinuous conduction mode, and a second threshold of said measured signal to transition from discontinuous conduction mode to active clamp flyback mode, wherein said second threshold is different from said first threshold.

3. The switched mode power supply of claim 1 wherein each of said first and second switches comprises a semiconductor based switch.

4. The switched mode power supply of claim 1 wherein said controller further clamps said switching frequency at a predetermined frequency when said load current is below a third predetermined level less than said second predetermined level.

5. The switched mode power supply of claim 4 wherein said predetermined frequency is above a human audible frequency range.

6. The switched mode power supply of claim 1 wherein said controller controls said second switch to transition between said active clamp flyback and discontinuous conduction modes, wherein a transition from said active clamp flyback mode to said discontinuous conduction mode comprises a threshold driven phasing out of said second switch, and wherein a transition from said discontinuous conduction mode to said active clamp flyback mode comprises a threshold driven phasing in of said second switch.

7. The switched mode power supply of claim 6 wherein said controller performs said threshold driven phasing in of said second switch using leading edge modulation of a slow ramp signal, and said threshold driven phasing out of said second switch using leading edge modulation of said slow ramp signal.

8. The switched mode power supply of claim 6 wherein said controller performs said threshold driven phasing in of said second switch using trailing edge modulation of a slow ramp signal, and said threshold driven phasing out of said second switch using trailing edge modulation of said slow ramp signal.

9. The switched mode power supply of claim 6 wherein said controller performs said threshold driven phasing in of said second switch using dual edge modulation of a slow ramp signal against a faster triangular signal, and said threshold driven phasing out of said second switch using dual edge modulation of said slow ramp signal against said faster triangular signal.

10. The switched mode power supply of claim 6 wherein said controller performs said threshold driven phasing in of said second switch and said threshold driven phasing out of said second switch by generating digital signals.

11. The switched mode power supply of claim 1 further comprising an optocoupler electrically coupled to said controller and electrically coupled to an output of said active clamp flyback converter, wherein said optocoupler is configured to isolate said controller from said output of said active clamp flyback converter.

12. A switched mode power supply, comprising:
a controller for controlling a first switch and a second switch of an active clamp flyback converter;
wherein said controller configures said first switch to control a flow of current through a primary winding of a flyback transformer;
wherein said controller configures said second switch to control an active clamp on a primary side of said flyback transformer; and
wherein said controller is configured to control said first and second switches to operate said active clamp flyback converter in an active clamp flyback mode when a load current is greater than a first predetermined level, and further configured to control said first and second switches to operate said active clamp flyback converter in a discontinuous conduction mode with a variable switching frequency when said load current is less than a second predetermined level wherein said controller keeps said second switch inactive while said active clamp flyback converter is in said discontinuous conduction mode.

13. The switched mode power supply of claim 12 wherein said controller comprises a feedback input that receives a measured signal representative of said load current.

14. The switched mode power supply of claim 13 wherein said controller uses a first threshold of said measured signal to transition from said active clamp flyback mode to said discontinuous conduction mode, and a second threshold of said measured signal to transition from discontinuous conduction mode to active clamp flyback mode, wherein said second threshold is different from than said first threshold.

15. The switched mode power supply of claim 13 wherein said measured signal comprises a feedback signal and said controller further uses said feedback signal in a voltage control loop.

16. The switched mode power supply of claim 12 wherein said first and second switches are combined with said controller in a single integrated circuit.

17. The switched mode power supply of claim 12 wherein said controller further clamps said switching frequency at a predetermined frequency when said load current is below a third predetermined level less than said second predetermined level.

18. The switched mode power supply of claim 17 wherein said predetermined frequency is above a human audible frequency range.

19. The switched mode power supply of claim 12 wherein said controller is configured to set a hysteresis width between said first predetermined level and said second predetermined level.

20. The switched mode power supply of claim 12 wherein said controller controls said second switch to transition between said active clamp flyback and discontinuous conduction modes, wherein a transition from said active clamp flyback mode to said discontinuous conduction mode comprises a threshold driven phasing out of said second switch, and wherein a transition from said discontinuous conduction mode to said active clamp flyback mode comprises a threshold driven phasing in of said second switch.

21. The switched mode power supply of claim 20 wherein said controller performs said threshold driven phasing in of said second switch using leading edge modulation of a slow ramp signal, and said threshold driven phasing out of said second switch using leading edge modulation of said slow ramp signal.

22. The switched mode power supply of claim 20 wherein said controller performs said threshold driven phasing in of said second switch using trailing edge modulation of a slow ramp signal, and said threshold driven phasing out of said second switch using trailing edge modulation of said slow ramp signal.

23. A method comprising:
receiving an input voltage at a first end of a primary winding of a transformer;
selectively switching a second end of said primary winding to a reference voltage terminal;
generating an output voltage from a secondary winding of said transformer;
in an active clamp flyback mode, modulating said primary winding and selectively clamping a voltage across said primary winding to regulate said output voltage to a predetermined level;
in a discontinuous conduction mode, modulating said primary winding and selectively reducing a frequency of said modulating to regulate said output voltage to said predetermined level and stopping clamping said voltage across said primary winding in said discontinuous conduction mode; and
switching between said active clamp flyback mode and said discontinuous conduction mode in response to a load current.

24. The method of claim 23 wherein said switching between said active clamp flyback mode and said discontinuous conduction mode in response to said load current comprises measuring said load current in response to said output voltage.

25. The method of claim 23 wherein said switching between said active clamp flyback mode and said discontinuous conduction mode comprises:
switching between said active clamp flyback mode and said discontinuous conduction mode by phasing in said selectively clamping; and
switching between said discontinuous conduction mode and said active clamp flyback mode by phasing out said selectively clamping.

26. The method of claim 25 wherein:
said phasing in said selectively clamping comprises phasing in said selectively clamping using leading edge modulation of a slow ramp signal; and
said phasing out said selectively clamping comprises phasing out said selectively clamping using leading edge modulation of said slow ramp signal.

27. The method of claim 25 wherein:
said phasing in said selectively clamping comprises phasing in said selectively clamping using trailing edge modulation of a slow ramp signal; and
said phasing out said selectively clamping comprises phasing out said selectively clamping using trailing edge modulation of said slow ramp signal.

28. The method of claim 23 wherein said switching between said active clamp flyback mode and said discontinuous conduction comprises switching from said discontinuous conduction mode and said active clamp flyback mode when said load current exceeds a first predetermined level, and switching from said active clamp flyback mode to said discontinuous conduction mode when said load current is less than a second predetermined level, wherein said second predetermined level is less than said first predetermined level.

29. The method of claim 28 wherein said selectively reducing said frequency of said modulating to regulate said output voltage to said predetermined level in said discontinuous conduction mode comprises selectively reducing said frequency of said modulating down to a predetermined frequency when said load current is below a third predetermined level less than said second predetermined level.

30. The method of claim 29 wherein said selectively reducing said frequency of said modulating down to said predetermined frequency comprises selectively reducing said frequency of said modulating down to a frequency above a human audible frequency range.

\* \* \* \* \*